Oct. 12, 1937.                W. R. TALIAFERRO                2,095,773
                             MOTOR CONTROL SYSTEM
                             Filed March 5, 1936            2 Sheets-Sheet 1
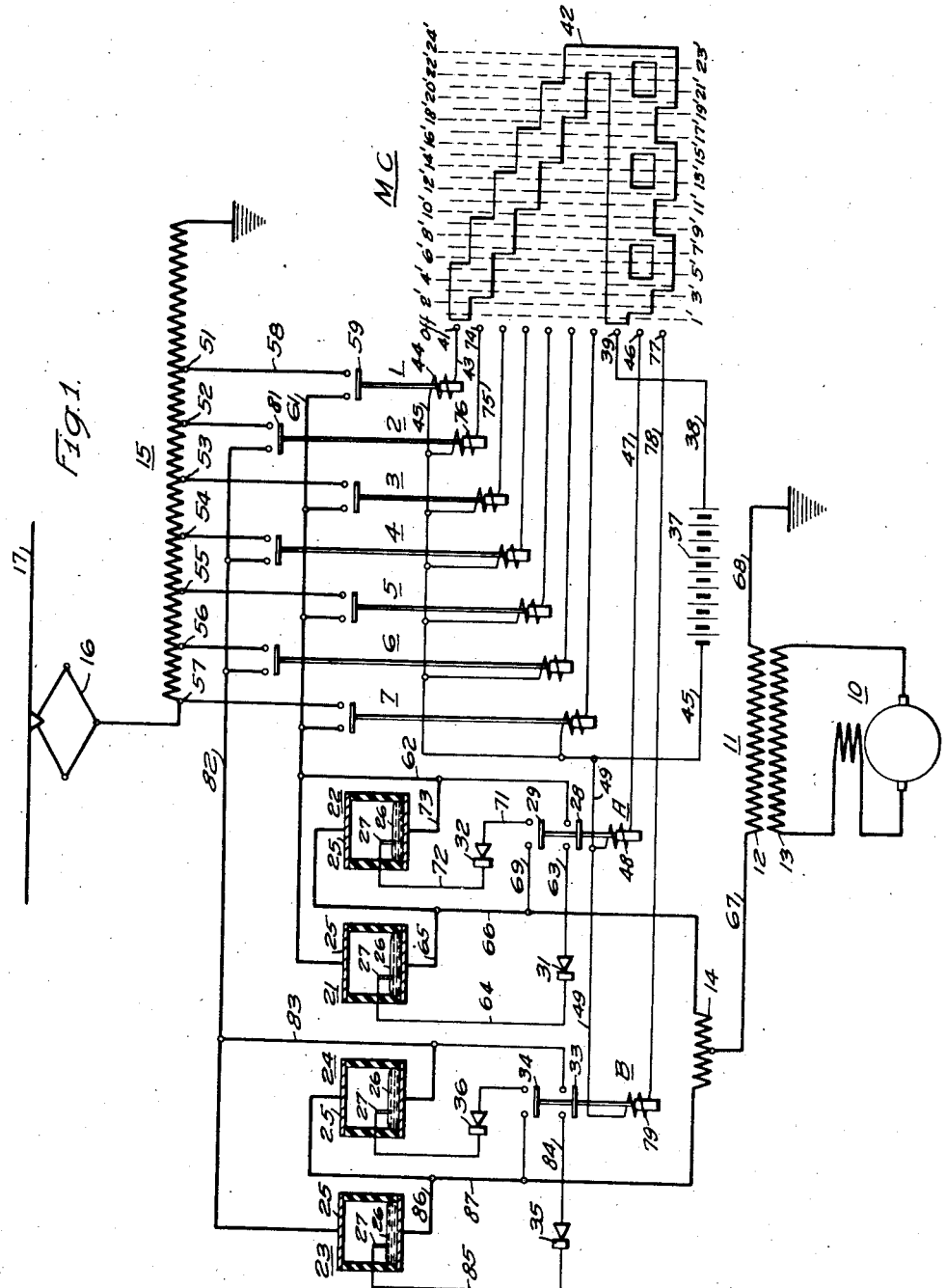
WITNESSES:                                          INVENTOR
E. A. McCloskey                                  William R. Taliaferro.
                                                  BY
                                                     ATTORNEY

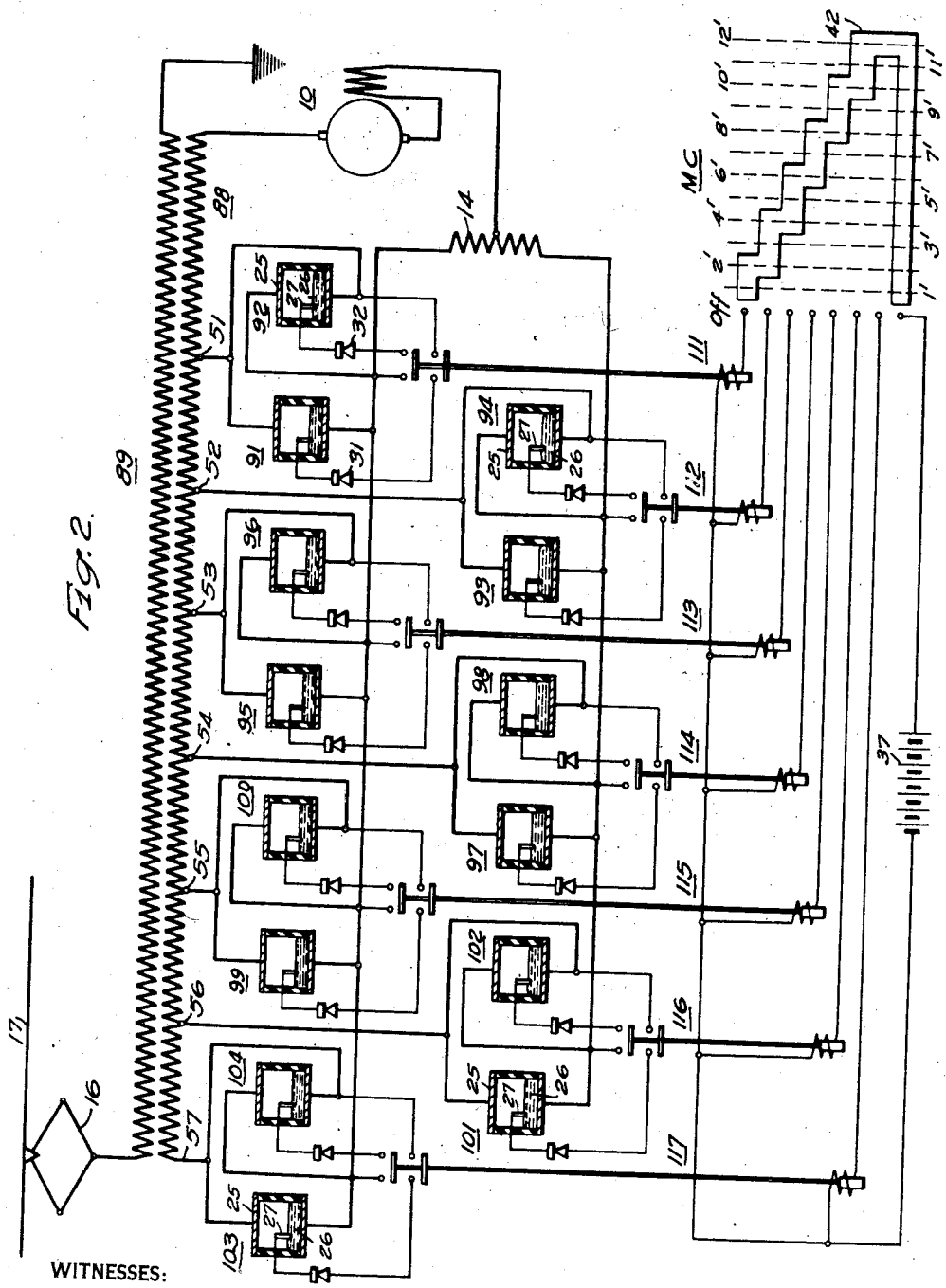

Patented Oct. 12, 1937

2,095,773

UNITED STATES PATENT OFFICE 2,095,773

MOTOR CONTROL SYSTEM

William R. Taliaferro, Pittsburgh, Pa., assignor to Westinghouse Electric & Manufacturing Company, East Pittsburgh, Pa., a corporation of Pennsylvania Application March 5, 1936, Serial No. 67,287

5 Claims. (Cl. 171—119)

My invention relates, generally, to motor control systems, and, more particularly, to systems for controlling the operation of the propelling motors of electric locomotives or other electrically-propelled vehicles.

Heretofore, the speed of an alternating-current locomotive has usually been controlled by changing the taps on the low tension side of a locomotive transformer by means of unit switches which must be capable of interrupting power circuits through which a large amount of current is flowing. Consequently, each tap-changing switch is large in size and expensive to manufacture, thereby making it difficult and expensive to provide sufficient taps for the proper operation of a locomotive.

An object of my invention, generally stated, is to provide a control system for electric motors which shall be simple and efficient in operation and which may be economically manufactured and installed.

A more specific object of my invention is to prevent interrupting the power circuit of a locomotive control system by means of tap-changing switches.

Another object of my invention is to provide a locomotive control system in which the tap-changing operations are performed on the high-tension winding of a transformer.

Other objects of the invention will be explained fully hereinafter or will be apparent to those skilled in the art.

According to one embodiment of the invention, small, light and inexpensive switches are utilized for tap-changing instead of the large and heavy circuit-breaking switches previously used. The tap-changing switches are so connected in the system that they never interrupt the power circuit, the arc rupturing duty being performed by electronic devices which are alternately made conducting and non-conducting by controlling the energization of the control elements of the electronic devices. In this manner the tap-changing switches are never required to close or open a circuit in which any current can flow at the time of operation of the switch.

For a fuller understanding of the nature and objects of the invention, reference may be had to the following detailed description, taken in conjunction with the accompanying drawings, in which:

Figure 1 is a diagrammatic view of a control system embodying the principal features of the invention; and Fig. 2 is also a diagrammatic view of a modified form of the invention.

Referring to Fig. 1 of the drawings, the system shown comprises a motor 10, a transformer 11 having a primary winding 12 and a secondary winding 13, a preventive coil 14 and an auto-transformer 15. Power for operating the motor 10, which is connected across the secondary winding 13 of the transformer 11, is supplied through the auto-transformer 15 which is connected to a current collecting device 16 that engages a trolley conductor 17 which may be connected to any suitable source of power (not shown).

In order that the voltage applied to the motor 10 may be varied to control the operating speed of the motor, a plurality of taps are provided on the winding of the auto-transformer 15. Tap-changing switches 1 to 7, inclusive, are provided for changing from one tap to another on the transformer 15 in sequential relation. A master controller MC is provided for controlling the operation of the tap-changing switches 1 to 7 in a manner which will be more fully described hereinafter.

As stated hereinbefore, in previously known locomotive control systems the tap-changing switches have been required to open and close the power circuit while current is flowing to the motors, thereby making it necessary to so construct the tap-changing switches that they are capable of performing arc rupturing duty. In the present system, I have provided a plurality of ignition-controlled mercury-cathode electronic devices 21 to 24, inclusive, which are so connected in the power system that the tap-changing switches 1 to 7, inclusive, are prevented from closing or opening the power circuit while current is flowing to the motor 10. Since the arc rupturing duty is performed by the electronic devices, the tap-changing switches may be of a cheaper and lighter construction, thereby effecting a saving in the cost of the locomotive equipment as well as in the space required for the equipment.

Each one of the electronic devices 21 to 24 comprises an anode 25 and a mercury cathode 26. The control function for the device is performed by an electrode 27, generally called an igniter, the end of which is disposed in the mercury cathode 26 as shown. The characteristics of the electronic device are such that no current will flow from the anode 25 to the cathode 26 until operation of the device is started by energizing the igniter 27. After the device is started, current will continue to flow during the positive half cycle, but is automatically extinguished at the end of the half cycle and the igniter must be energized at the beginning of the next positive half cycle in order to restart the device.

As shown, the electronic devices 21 and 22 are so connected that the device 21 permits current to flow during one half of each cycle of operation and the device 22 operates during the other half cycle of the current wave. The energization of the igniters 27 for the devices 21 and 22 is controlled by an electrically operated switch A having two pairs of contact members 28 and 29 for simultaneously energizing and deenergizing the igniters 27 on the electronic devices 21 and 22. Current blocking rectifying devices 31 and 32 are provided in the control circuits for the igniters of the electronic devices 21 and 22, respectively, to prevent current from flowing through the igniter circuits except during the proper half cycle of current wave during which the respective devices are in operation.

The electronic devices 23 and 24 are similar to the devices 21 and 22 and are so connected in the power circuit that the device 23 conducts current during one half cycle and the device 24 during the other half cycle of a current wave. The energization of the igniters 27 for the devices 23 and 24 is controlled by a switch B having contact members 33 and 34 connected in the igniter circuits for the devices 23 and 24, respectively. Current blocking devices 35 and 36 are also provided in the igniter circuits for the electronic devices 23 and 24, respectively.

While I have illustrated electronic devices of the ignition-controlled type, it will be understood that any other suitable electronic device, such as a grid-controlled device, may be utilized to control the flow of current in the power circuits. As is well known in the art, the characteristics of grid-controlled electronic devices are such that the flow of current through the device may be controlled by the proper energization of the grid controlling element of the device. Therefore, the system herein disclosed is not limited to the use of electronic devices of the type herein described.

In order that the functioning of the foregoing apparatus may be more clearly understood, the operation of the control system will now be described in more detail.

Assuming that it is desired to connect the motor 10 to the power source, the master controller MC may be actuated through position 1' to position 2'. As the controller passes through position 1', the tap-changing switch 1 is closed; however, no current will flow through the switch at this time. The energizing circuit for the actuating coil of the switch 1 extends from the positive terminal of a battery 37 through a conductor 38, contact fingers 39 and 41, bridged by a segment 42 on the controller MC, conductor 43, the actuating coil 44 of the switch 1 and a conductor 45 to the negative terminal of the battery 37.

When the controller MC is actuated to position 2', the switch A is closed to energize the igniter circuits for the electronic devices 21 and 22. Therefore, current is permitted to flow from the transformer 15 through the switch 1, the electronic devices 21 and 22, the preventive coil 14 and the primary winding 12 of the transformer 11, thereby energizing the motor 10 which is connected across the secondary winding 13 of the transformer 11. The energizing current for the actuating coil of the switch A may be traced from a contact finger 46, which engages the segment 42 on the controller MC, through conductor 47, the actuating coil 48 of the switch A and conductors 49 and 45 to the negative terminal of the battery 37.

The closing of the switch A energizes the igniter 27 of the electronic device 21 through a circuit which may be traced from the tap 51 of the transformer 15 through conductor 58, contact members 59 of the switch 1, conductors 61 and 62, contact members 28 of the switch A, conductor 63, the rectifying device 31, conductor 64, the igniter 27 and the mercury cathode 26 of the electronic device 21, conductors 65 and 66, a portion of the preventive coil 14, conductor 67 and the transformer winding 12 to a grounded conductor 68. In this manner current is permitted to flow through the igniter 27 which produces a spark that causes an arc to be drawn between the cathode and anode of the device 21, thereby permitting current to flow from the anode to the cathode, which will continue to flow during a half cycle of the current wave. During the other half cycle of operation, current first flows from the grounded conductor 68 through the transformer winding 12, the conductor 67, the preventive coil 14, the conductors 66 and 69, contact members 29 of the switch A, conductor 71, the rectifying device 32, conductor 72, the igniter 27 and mercury cathode 26 of the electronic device 22, conductors 73, 62 and 61, the contact members 59 of the switch 1 and conductor 58 to the tap 51 of the transformer winding 15. The energization of the igniter for the electronic device 22 functions to start operation of the device in the same manner as for the device 21 and current continues to flow through the device 22 for a half cycle.

In this manner, power is supplied to the motor 10 as long as the switch A remains closed to cause the electronic devices 21 and 22 to be re-ignited at the beginning of each half cycle. However, it will be noted that the switch 1 was closed before the energization of the electronic devices 21 and 22; therefore, motor load current could not flow through the switch 1 until after the electronic devices were put in operation.

If it is desired to increase the voltage applied to the motor 10 to increase its speed, the master controller MC may be actuated through position 3' to position 4', thereby first closing the switch 2 and then closing the switch B to energize the igniter circuits for the electronic devices 23 and 24.

The energizing circuit for the actuating coil of the switch 2 may be traced from the contact finger 74, which engages the segment 42 on the controller MC, through conductor 75, the actuating coil 76 of the switch 2 and conductor 45 to the battery 37.

The energizing circuit for the actuating coil of the switch B extends from a contact finger 77, which engages the segment 42 when the master controller MC is on position 4', through conductor 78, actuating coil 79 of the switch B and conductors 49 and 45 to the battery 37.

The closing of the switches 2 and B energizes the control elements for the electronic devices 23 and 24, thereby permitting current to flow through these devices in the same manner as previously described for the devices 21 and 22. During one half cycle current flows from the tap 52 of the transformer winding 15 through contact members 81 of the switch 2, conductors 82 and 83, the contact members 33 of the switch B, conductor 84, the rectifying device 35, conductor 85, the igniter 27 and cathode 26 of the electronic device 23, conductors 86 and 87, the preventive coil 14, conductor 67, and the transformer winding 12 to the grounded conductor 68. The energization of the igniter 27 causes an arc to be formed between the anode and cathode of the device 23, thereby permitting current to flow from the anode to the cathode during the remainder of the half cycle of the current wave. During the other half cycle, current flows through the electronic device 24 in the same manner as through the device 22.

The voltage applied to the motor 10 may be still further increased by actuating the controller MC through position 5' to position 6', thereby deenergizing the actuating coil of the switch 1. However, the switch A is opened prior to the deenergization of the switch 1, thereby deenergizing the control elements of the electronic devices 21 and 22 which stops the flow of current through these respective devices at the end of the existing half cycle of the current wave. In this manner, the switch 1 is prevented from interrupting the power circuit. Therefore, it does not have to be constructed for arc rupturing duty, since the power circuit is interrupted by means of the electronic devices 21 and 22.

When the controller MC is actuated through position 7' to position 8', the switch 3 is first closed and then the switch A is closed to re-establish the energizing circuits for the control elements of the electronic devices 21 and 22, thereby connecting these devices to the tap 53 of the transformer winding 15 and permitting current to flow through the transformer 11 in the manner hereinbefore described.

It will be noted that the controller MC is so constructed that the switch 3 is closed prior to the closing of the switch A and therefore the switch 3 does not establish the power circuit, this function being performed by the electronic devices 21 and 22. Likewise, the power circuit is always interrupted by means of the electronic devices 21 and 22 or 23 and 24, since the switches A and B are always opened prior to the opening of one of the tap-changing switches as the master controller MC is advanced to operate the tap-changing switches to increase the voltage applied to the motor 10 by connecting the transformer 11 to the taps 51 to 57 in sequential relation. In this manner the operation of the tap-changing switches 1 to 7 and the electronic devices 21 to 24 is coordinated to prevent the interruption of a power circuit by any one of the tap-changing switches.

In the modification of the invention shown in Fig. 2, one terminal of the motor 10 is connected directly to the secondary winding 88 of a two-winding transformer 89 which replaces the auto-transformer 15 shown in Fig. 1. The secondary winding 88 is provided with taps 51 to 57, inclusive, for gradually increasing the voltage applied to the motor 10 in the usual manner.

However, in this modification, the tap-changing operations are performed by a plurality of electronic devices 91 to 104, inclusive, which are utilized to perform the switching operations usually performed by tap-changing switches. The electronic devices shown are of the same construction as the devices shown in Fig. 1, each device having an anode 25, a cathode 26 and an igniter 27.

It will be noted that the electronic devices are arranged in pairs, one device of each pair being so connected that it permits current to flow during one half cycle and the other device permitting current to flow during the other half cycle of the current wave. The energization of the igniter control elements of the pairs of electronic devices is controlled by electrically operated switches 111 to 117, inclusive, each switch having a pair of contact members for establishing the control circuits for the igniter elements of a pair of electronic devices.

The operation of the switches 111 to 117 is so controlled by means of a master controller MC that current is allowed to flow through the motor 10 from successive taps 51 to 57 on the transformer winding 88, thereby increasing the voltage applied to the motor in a manner similar to that described hereinbefore. Thus, when the controller MC is actuated to position 1', the switch 111 is closed to energize the control elements of the electronic devices 91 and 92, thereby permitting current to flow through these devices and the preventive coil 14 to the motor 10 from the tap 51 of the transformer winding 88. When the controller MC is actuated to position 2', the switch 112 is closed to connect the preventive coil 14 and the motor 10 to the tap 52 on the transformer winding 88.

It will be noted that when the controller MC is actuated to position 3', the actuating coil of the switch 111 is deenergized, thereby permitting this switch to open, which deenergizes the control elements of the electronic devices 91 and 92 to stop the flow of current through these devices, thereby disconnecting the motor 10 from the tap 51. In this manner the arc rupturing duty previously performed by tap-changing switches is now performed by the electronic devices. The control elements of the respective electronic devices may be energized and deenergized in the proper sequence to effect the tap-changing operations by simply operating the controller MC in the usual manner to control the operation of the switches 111 to 117, inclusive.

It will be understood that the electronic devices may be utilized to perform tap-changing operations on the high tension side of a transformer as well as on the low tension side, as illustrated in Fig. 2. Thus, if desired, the tap-changing operations could be performed on the high tension side of the transformer, and an additional transformer, similar to the transformer 11 shown in Fig. 1, may be interposed in the motor circuit to provide the desired ratio of voltage transformation. Furthermore, grid-controlled electronic devices may be utilized in place of the igniter-controlled devices illustrated in Fig. 2, grid-controlled devices being well known in the art.

From the foregoing description, it is apparent that I have provided tap-changing systems in which all interrupting of power circuits is performed by electronic devices, thereby making it unnecessary for the tap-changing switches to be of a suitable construction for arc rupturing duty, which permits the tap-changing switches to be of a smaller and cheaper structure. Since a large number of tap-changing switches are usually required on a locomotive to provide the necessary control of the voltage applied to the propelling motors, considerable saving in the cost and the space required for the equipment in the locomotive can be effected by utilizing the systems herein disclosed.

Since numerous changes may be made in the above-described construction, and different embodiments of the invention may be made without departing from the spirit and scope thereof, it is intended that all matter contained in the above description or shown in the accompanying drawings shall be interpreted as illustrative and not in a limiting sense.

I claim as my invention:

1. In a tap-changing system, in combination, a transformer winding, a plurality of switches for changing taps on the transformer winding, electronic devices for controlling the flow of current through the tap-changing switches, and means including current blocking rectifying devices for controlling the operation of the electronic devices.

2. In a tap-changing system, in combination, a transformer winding, a plurality of switches for changing taps on the winding, electronic devices cooperating with the tap-changing switches, current blocking rectifying devices for controlling the energization of the electronic devices, and control means for coordinating the operation of the electronic devices and the tap-changing switches.

3. In a tap-changing system, in combination, a transformer winding having a plurality of taps thereon, power conversion apparatus, a plurality of switches for connecting said apparatus to successive taps on the transformer winding, electronic devices for controlling the flow of current to the power conversion apparatus, current blocking rectifying devices for controlling the energization of the electronic devices, and control means for coordinating the operation of the electronic devices and the tap-changing switches.

4. In a tap-changing system, in combination, a transformer winding having a plurality of taps thereon, power conversion apparatus, a plurality of switches for connecting said apparatus to successive taps on the transformer winding, electronic devices disposed between said apparatus and said switches for controlling the flow of current through the switches, current blocking rectifying devices for controlling the energization of the electronic devices, and control means for coordinating the operation of the electronic devices and the tap-changing switches to prevent the switches from interrupting a power circuit.

5. In a tap-changing system, in combination, a transformer winding having a plurality of taps thereon, power conversion apparatus, a plurality of switches for connecting said apparatus to successive taps on the transformer winding, a plurality of electronic devices for controlling the flow of current to said apparatus, said electronic devices having control elements for controlling their operation, current blocking rectifying devices disposed in the circuits for said control elements, switching means cooperating with said current blocking rectifying means for controlling the energization of said control elements, and control means for coordinating the operation of the tap-changing switches and said switching means.

WILLIAM R. TALIAFERRO.